(12) United States Patent
Kyoto

(10) Patent No.: US 9,446,481 B2
(45) Date of Patent: Sep. 20, 2016

(54) LASER MACHINING DEVICE

(71) Applicant: Mitsubishi Electric Corporation, Tokyo (JP)

(72) Inventor: Tomohiro Kyoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/407,286

(22) PCT Filed: Apr. 23, 2013

(86) PCT No.: PCT/JP2013/061934
§ 371 (c)(1),
(2) Date: Dec. 11, 2014

(87) PCT Pub. No.: WO2014/038241
PCT Pub. Date: Mar. 13, 2014

(65) Prior Publication Data
US 2015/0158123 A1    Jun. 11, 2015

(30) Foreign Application Priority Data
Sep. 5, 2012  (JP) ................................. 2012-195155

(51) Int. Cl.
*B23K 26/36* (2014.01)
*B23K 26/08* (2014.01)
(Continued)

(52) U.S. Cl.
CPC ........... *B23K 26/36* (2013.01); *B23K 26/0869* (2013.01); *B23K 26/128* (2013.01); *B23K 26/142* (2015.10); *B23K 26/1435* (2013.01)

(58) Field of Classification Search
CPC ...... B23K 26/00; B23K 26/08; B23K 26/36; B23K 26/0869; B23K 26/1435; H01S 3/10; B23Q 15/00

USPC ......................... 372/9–32; 219/121.6–121.86
See application file for complete search history.

(56) References Cited

U.S. PATENT DOCUMENTS 4,131,782 A * 12/1978 Einstein .................... B41C 1/05
219/121.18
4,977,512 A * 12/1990 Nakagawa ......... G05B 19/4207
219/121.82
(Continued)

FOREIGN PATENT DOCUMENTS

DE    3934587 A1    4/1991
JP    02235588 A  *  9/1990
(Continued)

OTHER PUBLICATIONS

International Search Report for PCT/JP2013/061934 dated Jul. 30, 2013.
(Continued)

*Primary Examiner* — Samuel M Heinrich
(74) *Attorney, Agent, or Firm* — Sughrue Mion, PLLC

(57) ABSTRACT

Provided is a laser machining device that includes a laser oscillator that oscillates a laser beam; a machining head that irradiates the laser beam emitted from the laser oscillator onto a workpiece; and an optical path duct that includes an optical system that guides the laser beam from the laser oscillator to the machining head. A plurality of operation modes, in each of which a parameter is varied when being used when the workpiece is being machined, are provided for the laser machining device; and an energy saving mode, in which the output range of the laser beam is set to be less than that in other operation modes, is included in the operation modes.

9 Claims, 3 Drawing Sheets

(51) Int. Cl.
*B23K 26/14* (2014.01)
*B23K 26/12* (2014.01)

(56) References Cited

U.S. PATENT DOCUMENTS

| | | | |
|---|---|---|---|
| 5,093,548 A | 3/1992 | Schmidt-Hebbel | |
| 6,418,155 B1* | 7/2002 | Wakabayashi | H01S 3/131 372/25 |
| 6,894,248 B2 | 5/2005 | Arakawa et al. | |
| 2005/0061778 A1* | 3/2005 | Arakawa | B23K 26/03 219/121.6 |
| 2010/0243626 A1* | 9/2010 | Baldwin | B23K 26/0622 219/121.72 |
| 2013/0170514 A1 | 7/2013 | Sugiyama et al. | |

FOREIGN PATENT DOCUMENTS

| | | |
|---|---|---|
| JP | 06-161535 A | 6/1994 |
| JP | 2010-240800 A | 10/2010 |
| JP | 2011-115967 A | 6/2011 |
| WO | 2004/103633 A1 | 12/2004 |
| WO | 2012/036008 A1 | 3/2012 |

OTHER PUBLICATIONS

Communication dated Nov. 2, 2015 from the German Patent and Trademark Office issued in corresponding Application No. 112013004346.7.

Volker Albrecht, "Effizient zum Blechteil", Produktion Und Prozesse: Titelthema, Industrieanzeiger, vol. 25, 2010, 4 pages total.

* cited by examiner

FIG.2

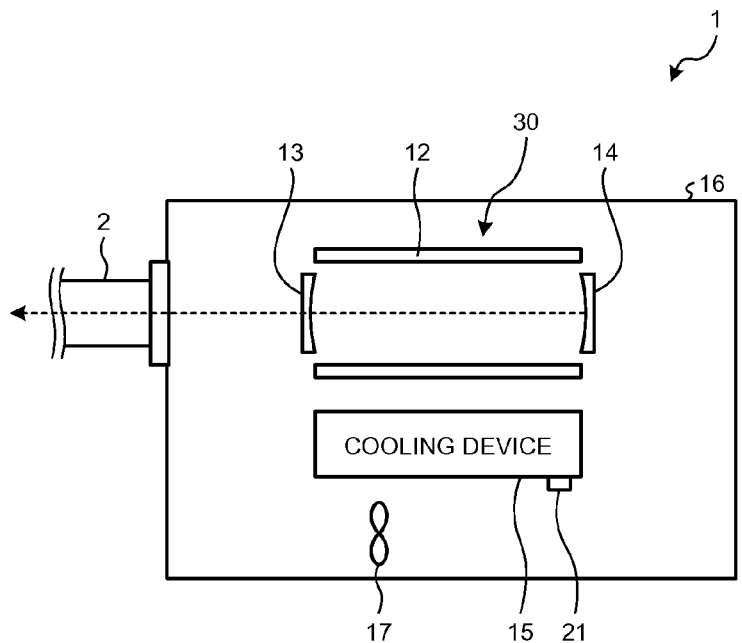

FIG.3

| No. | CONTROL PARAMETER | OPERATING MODE | | |
|---|---|---|---|---|
| | | QUALITY EMPHASIS MODE | PRODUCTIVITY EMPHASIS MODE | ENERGY SAVING MODE |
| 1 | OUTPUT RANGE OF LASER BEAM | UP TO 4000 W | UP TO 4000 W | UP TO 2000 W |
| 2 | NUMBER OF REVOLUTIONS OF LASER BLOWER 17 | 12000rpm | 12000rpm | 9000rpm |
| 3 | TEMPERATURE SETTING OF COOLING DEVICE 15 | 10°C±3°C | 10°C±3°C | 15°C±3°C |
| 4 | PURGE FLOW RATE OF OPTICAL PATH DUCT 2 | 50L/min | 50L/min | 25L/min |
| 5 | SPEED (MOVING SPEED) OF MACHINING HEAD 4 ON X, Y, AND Z AXES | UP TO 5 m/s | UP TO 15 m/s | UP TO 5 m/s |
| 6 | DRAWN AIR VOLUME OF DUST COLLECTOR 7 | 80m³/min | 80m³/min | 60m³/min |

LASER MACHINING DEVICE

CROSS REFERENCE TO RELATED APPLICATIONS

This application is a National Stage of International Application No. PCT/JP2013/061934 filed on Apr. 23, 2013, claiming priority based on Japanese Patent Application No. 2012-195155 filed Sep. 5, 2012, the contents of all of which are incorporated herein by reference in their entirety.

FIELD

The present invention relates to a laser machining device that machines a workpiece by using a laser beam.

BACKGROUND

It is common practice to use various machine tools at a production location. With a machine tool, when machining a workpiece, a parameter is set as an operating condition for each of the elements with which the machine tool is equipped. There are cases where, with a machine tool, machining of a higher quality is required or machining with reduced energy consumption is required, and the parameter to which each of the elements is set are different depending on the required condition. Patent Literatures 1 to 3, for example, is related to the above in that disclosed therein is a machine tool that is capable of switching between operation modes, each having a different parameter corresponding to the operational conditions or purpose of the machine tool.

CITATION LIST

Patent Literatures

Patent Literature 1: Japanese Patent Application Laid-open No. 2011-115967
Patent Literature 2: Japanese Patent Application Laid-open No. H6-161535
Patent Literature 3: Japanese Patent Application Laid-open No. 2010-240800

SUMMARY

Technical Problem

An example is given here of a machine tool that has a laser machining device that machines a workpiece by using a laser beam. Generally, with a laser machining device, parameters are optimized, at the time of shipment, in order that a workpiece is machined with higher productivity and to a higher quality.

Machining with optimized parameters for improving the productivity and quality tends to require a large amount of energy consumption. Recently, as energy saving has become a requirement, there is a need to perform machining within parameters capable of maintaining the productivity and quality while reducing the energy consumption.

However, in the conventional techniques described above, there is no disclosure of switching between operation modes in a laser machining device. Furthermore, a parameter to which the laser machining device is uniquely set, such as a parameter related to the output of laser beam, is not disclosed. Therefore, if the above described conventional techniques are used without modification, it is difficult to provide a laser machining device that can switch between operation modes specifying the operational settings or purpose of the laser machining device.

The present invention has been achieved in view of the above problems, and an objective of the present invention is to provide a laser machining device that can machine a workpiece by switching between operation modes, in each of which parameters unique to the laser machining device such as the output of laser beam are varied.

Solution to Problem

To solve the problems above and achieve the objective, the present invention relates to a laser machining device that includes: a laser oscillator that oscillates a laser beam; a machining head that irradiates the laser beam emitted from the laser oscillator onto a workpiece; and an optical path duct that includes an optical system that guides the laser beam from the laser oscillator to the machining head. A plurality of operation modes, in each of which a parameter used when the workpiece is being machined is varied, are provided for the laser machining device; and an energy saving mode, in which an output range of the laser beam, as the parameter, is set to be less than that in other operation modes, is included in the operation modes.

Advantageous Effects of Invention

According to the laser machining device of the present invention, a workpiece can be machined while switching between operation modes and with the parameters to which the laser machining device is specified being varied.

BRIEF DESCRIPTION OF DRAWINGS

FIG. 2 is a diagram that illustrates a schematic configuration of a laser oscillation device.
FIG. 3 is a diagram that illustrates a table of parameters (a parameter table) for each of the operation modes stored in a storage unit.

DESCRIPTION OF EMBODIMENTS

Exemplary embodiments of a laser machining device according to the present invention will be described below in detail with reference to the accompanying drawings. The present invention is not limited to the embodiments.

First Embodiment

Figure 1:
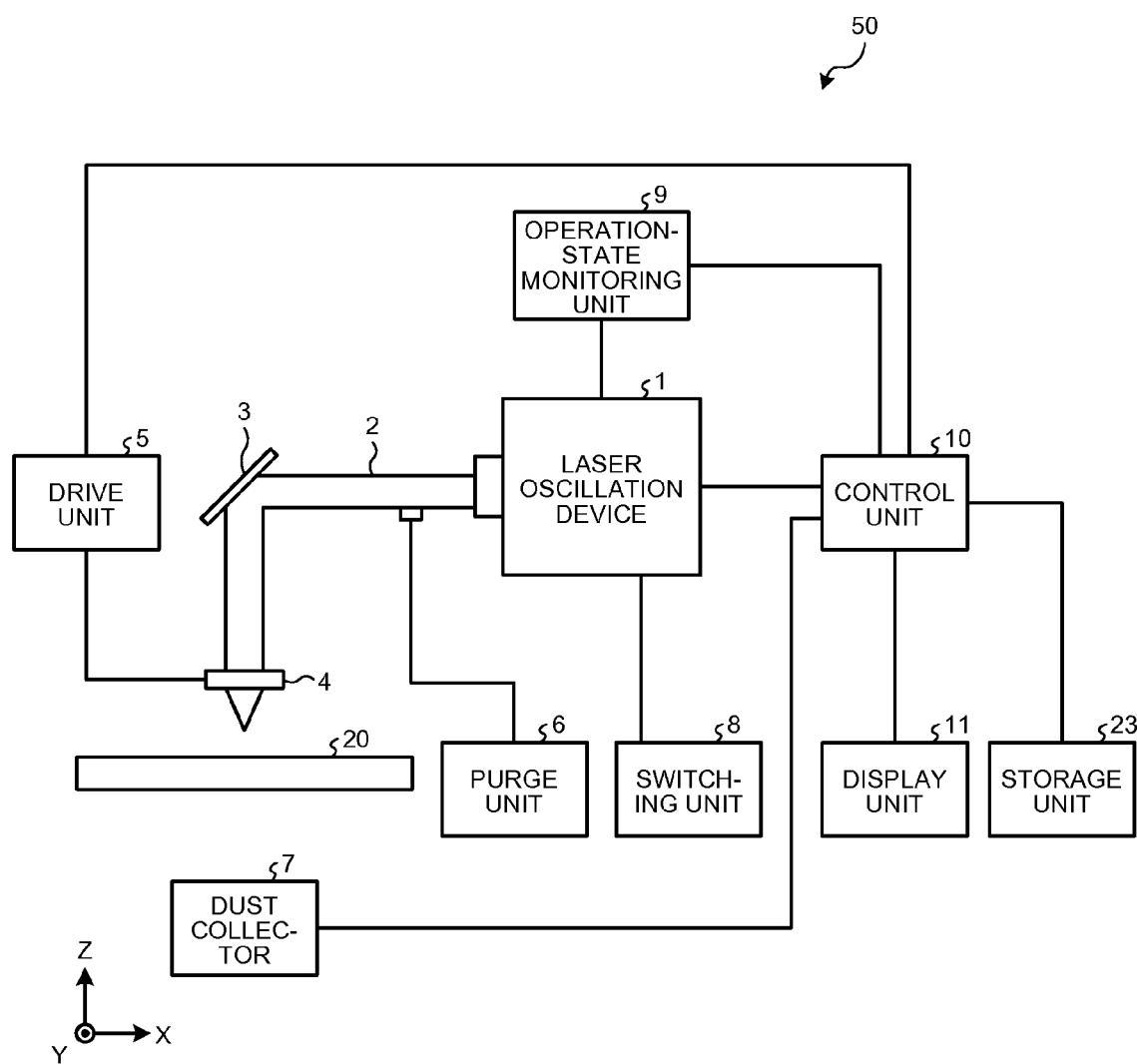
FIG. 1 is a diagram that illustrates a schematic configuration of a laser machining device according to a first embodiment of the present invention.

FIG. 1 is a diagram that illustrates a schematic configuration of a laser machining device according to a first embodiment of the present invention. A laser machining device 50 includes a laser oscillation device 1, an optical path duct 2, a bend mirror (optical system) 3, a machining head 4, a drive unit 5, a purge unit 6, a dust collector 7, a switching unit (output switching unit) 8, an operation-state monitoring unit 9, a control unit 10, a display unit 11, and a storage unit 23. The laser machining device 50 emits a laser beam oscillated by the laser oscillation device 1 from the machining head 4 to a workpiece 20 so as to machine the workpiece 20.

FIG. 2 is a diagram that illustrates a schematic configuration of the laser oscillation device 1. The laser oscillation device 1 is configured to accommodate a laser oscillator 30, a cooling device 15, and a laser blower (an air blower) 17 in a casing 16. Laser gas such as $CO_2$, CO, He, $N_2$, or $H_2$, which is the laser medium in the gas laser, is enclosed inside the casing 16. The laser blower 17 causes the laser gas to flow, thereby circulating the laser gas in the casing 16.

The laser oscillator 30 includes discharge electrodes 12, a partial reflection mirror 13, and a total reflection mirror 14. When a high voltage is input to the discharge electrodes 12 in the casing 16, electric discharge is generated between the discharge electrodes 12. The laser gas is excited by the electric discharge, and light generated by the excited laser gas is resonated between the partial reflection mirror 13 and the total reflection mirror 14. Subsequently, a part of the resonated light passes through the partial reflection mirror 13 as laser beam, and it is emitted towards the optical path duct 2.

The laser oscillator 30 easily has a high temperature because of the discharge electrodes 12 to which a high voltage is applied when a laser beam is emitted. The cooling device 15 cools the laser oscillator 30. A liquid refrigerant (fluid) such as water or a gas refrigerant (fluid) such as nitrogen can be caused to flow through the cooling device 15. The temperature of the cooling device 15 is detected by a thermometer 21. The temperature information measured by the thermometer 21 is transmitted to the control unit 10. The laser oscillator 30 is also cooled by the laser gas being circulated by the laser blower 17 in the casing 16. The amount of laser gas circulated is increased by increasing the revolutions of the laser blower 17, and thus the cooling effect of the laser oscillator 30 is increased.

An optical path is formed in the optical path duct 2 for guiding the laser beam emitted from the laser oscillator 30 to the machining head 4. A bent portion is provided along the optical path duct 2. The bend mirror 3 is provided at the bent portion of the optical path duct 2 to change the route of the laser beam and thus cause the laser beam to move along the optical path duct 2.

The purge unit 6 supplies purge gas into the optical path duct 2. The gas used as the purge gas is a gas, such as nitrogen or dried air, which does not affect absorption of the laser beam.

The laser beam having been transmitted through the optical path duct 2 and reached the machining head 4 is emitted from the tip of the machining head 4 toward the workpiece 20. The drive unit 5 moves the machining head 4 in an X-axis direction, a Y-axis direction, and a Z-axis direction. By moving the machining head 4, the irradiating position of the laser beam on the workpiece 20 also moves, and the workpiece 20 can be machined into the desired shape.

The dust collector 7 collects dust generated when the workpiece 20 is machined. The dust collector 7 is configured to include a compressor (not illustrated) or the like that draws air around the portion of the workpiece 20 being machined. The switching unit 8 is an operating unit that changes the parameter to which the laser machining device 50 is set. The parameter that can be changed by the switching unit 8, for example, includes the output of the laser beam emitted from the laser oscillation device 1 or the speed of the machining head 4 in the X-axis direction, the Y-axis direction, and the Z-axis direction when the workpiece 20 is being machined.

The operation-state monitoring unit 9 monitors the operation state of the laser machining device 50. Specifically, the operation-state monitoring unit 9 adds up the time during which the laser beam is emitted from the laser oscillator 30 (an accumulated time) and detects the beam shape of the laser beam emitted from the laser oscillator 30. When the accumulated time exceeds a preset threshold or when the beam shape deviates from a preset predetermined shape, the operation-state monitoring unit 9 transmits laser-beam deterioration information to the control unit 10.

In the laser oscillator 30, the partial reflection mirror 13 may deteriorate with age due to a temperature change or the like when emitting a laser beam, and then the laser beam's shape becomes deformed. The beam shape of the laser beam emitted from the laser oscillator 30 may also deform due to the deformation of the shape of the partial reflection mirror 13, and this may cause a decrease in the machining accuracy. For example, although the beam shape is preferably an exact circular shape, it may become an elliptical shape due to age deterioration of the partial reflection mirror 13. Note that, in the following explanations, the change of the beam shape of the laser beam due to age deterioration is also referred to simply as laser beam deterioration.

When the accumulated time exceeds a preset threshold, the operation-state monitoring unit 9 determines that the beam shape is deformed due to age deterioration or the like, and it sends laser-beam deterioration information to the control unit 10. The operation-state monitoring unit 9 also observes the beam shape directly, and, when the beam shape becomes deformed, the operation-state monitoring unit 9 transmits laser-beam deterioration information to the control unit 10.

To observe the beam shape directly, for example, it is sufficient to configure the bend mirror 3 from a half mirror, thereby observing the beam shape of the laser beam that has been transmitted through the bend mirror 3. In this case, the operation-state monitoring unit 9 includes an observing unit (not illustrated) that is provided at a position where the laser beam having been transmitted through the bend mirror 3 is irradiated and detects the beam shape.

In order to observe the beam shape directly, for example, an observing unit (not illustrated) that observes the beam shape can be arranged at a position where the laser beam emitted from the machining head 4 can be irradiated. When the machining head 4 is moved to a position at which the laser beam is irradiated onto the observing unit at a preset timing or an arbitrary timing, the beam shape can be observed. In this case, the operation-state monitoring unit 9 includes the observing unit that is provided at a position where the laser beam can be irradiated.

The control unit 10 controls various operations and various parameters of the laser machining device 50. The control unit 10 controls the laser oscillation device 1 and the drive unit 5 according to a machining program stored in the storage unit 23 and causes these units to perform machining of the workpiece 20.

The control unit 10 controls a parameter matched with the operation mode of the laser machining device 50. FIG. 3 is a diagram that illustrates a table of parameters (a parameter table) for each of the operation modes stored in the storage unit 23. The control unit 10 refers to the parameter table stored in the storage unit 23 and controls various parameters.

In the present embodiment, the exemplified parameters that are set for each of the operation modes are the "output range of laser beam", "number of revolutions of laser blower 17", "temperature setting of cooling device 15", "purge flow rate of optical path duct 2", "speed (moving speed) of machining head 4 along X, Y, and Z axes", and "drawn air volume of dust collector 7". However, the parameters are not limited thereto. The "output range of laser beam" and the "moving speed of machining head 4" among these parameters are parameters whose setting can be changed by a user with the switching unit. These parameters are said to be open to the user. Meanwhile, the parameters set in advance when the laser machining device 50 is shipped are the "number of revolutions of laser blower 17", the "temperature setting of cooling device 15", the "purge flow rate of optical path duct 2", and the "drawn air volume of dust collector 7", which are parameters other than the above two parameters and which cannot be changed by the user. These parameters are said to be not open to the user.

Setting and control of the parameters are performed by the control unit 10. For example, the control unit 10 controls a voltage to be applied to the discharge electrode 12 and controls the output of the laser beam. The control unit 10 also controls the flow rate of the refrigerant in the cooling device 15 and controls the temperature of the cooling device 15. The control unit 10 also adjusts the opening degree of a valve (not illustrated) that is provided between the purge unit 6 and the optical path duct 2 and controls the purge flow rate. The control unit 10 also controls the drive unit 5 and controls the moving speed of the machining head 4. The control unit 10 also controls the dust collector 7 and controls the drawn air volume.

In the laser machining device 50 according to the present embodiment, three types of operation modes are provided, which are "quality emphasis mode", "productivity emphasis mode", and "energy saving mode". First, the setting ranges of parameters open to a user in each of the operation modes will be described.

In the quality emphasis mode, the moving speed of the machining head 4 is reduced to be low while increasing the output range of the laser beam, thereby improving the machining quality of the workpiece 20. Specifically, the output range of the laser beam can be set up to 4000 watts, and the moving speed of the machining head 4 can be set up to 5 m/s.

In the productivity emphasis mode, the setting range of the moving speed of the machining head 4 is set larger than that in the quality emphasis mode, while the output range of the laser beam is set to be in the same range as that in the quality emphasis mode. Therefore, the machining speed of the workpiece 20 is improved. Specifically, the output range of the laser beam can be set up to 4000 watts, and the moving speed of the machining head 4 can be set up to 15 m/s.

In the energy saving mode, the moving speed of the machining head 4 is reduced as low as that in the quality emphasis mode while reducing the output range of the laser beam to be less than that in the quality emphasis mode and the productivity emphasis mode, so energy saving is achieved when the workpiece 20 is machined. Specifically, the output range of the laser beam can be set up to 2000 watts, and the moving speed of the machining head 4 can be set up to 5 m/s.

A user can set the output of the laser beam and the moving speed of the machining head 4 within ranges set for each of the operation modes by operating the switching unit 8. When the output of the laser beam and the moving speed of the machining head 4 are set at a value out of these ranges, the control unit 10 can cause the display unit 11 or the like to issue a warning so as to prompt the user to change the setting. Furthermore, during the time when a warning is issued, the control unit 10 can execute control such that operations of the laser machining device 50 are stopped. That is, the control unit 10 functions as an output regulating unit that regulates the laser beam such that it is not erroneously emitted as an unspecified output, and the control unit 10 also functions as a speed regulating unit that regulates the machining head 4 such that it does not to move at an unspecified speed. It is also possible to configure a plurality of control units 10 that are provided such that each control unit 10 has separate functions that are distributed among them.

The setting range of parameters that are not settable by a user in each of the operation modes is described next. First, the "number of revolutions of laser blower 17" is set to 12000 rpm in the quality emphasis mode and the productivity emphasis mode. In the energy saving mode, the "number of revolutions of laser blower 17" is set to 9000 rpm, which is lower than that in the quality emphasis mode and the productivity emphasis mode. This is because the output range of the laser beam in the energy saving mode is less than that in the quality emphasis mode and the productivity emphasis mode, and thus the laser oscillator 30 can be sufficiently cooled even when the number of revolutions of the laser blower 17 is reduced.

Figure 4:
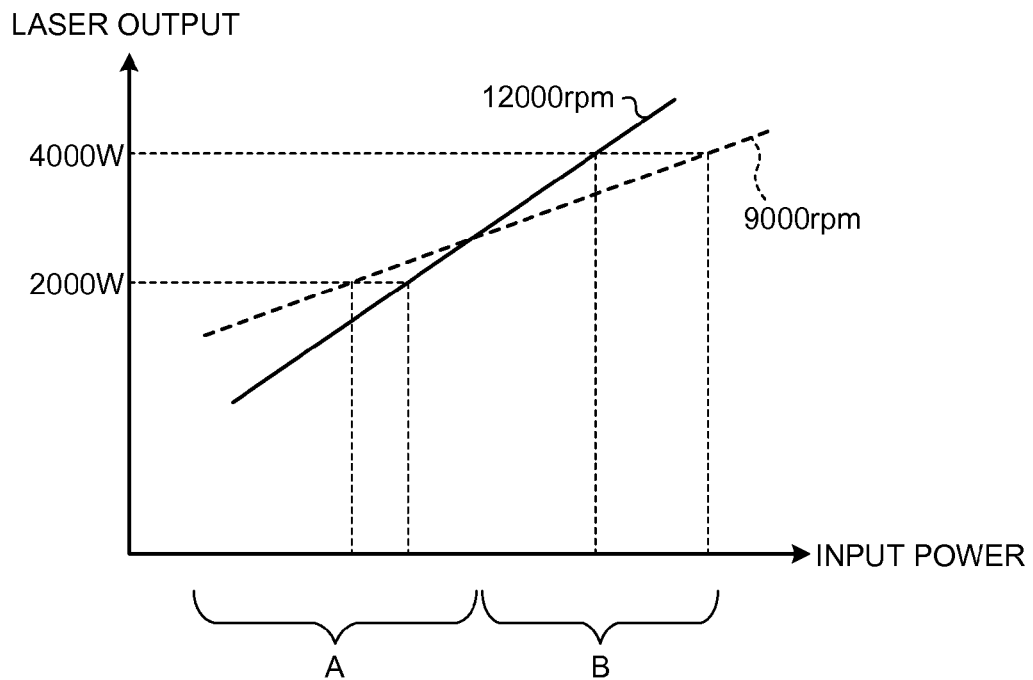
FIG. 4 is a diagram that illustrates the relation between input power to the discharge electrodes and laser output when the number of revolutions of a laser blower is varied.

Furthermore, in terms of energy efficiency, it is preferable to reduce the number of revolutions of the laser blower 17 in the energy saving mode. FIG. 4 is a diagram that illustrates the relation between input power to the discharge electrodes 12 and laser output when the number of revolutions of the laser blower 17 is varied. In FIG. 4, the case where the number of revolutions of the laser blower 17 is 12000 rpm is denoted by a solid line, and the case where the number of revolutions of the laser blower 17 is 9000 rpm is denoted by a broken line.

As illustrated in FIG. 4, the inclinations of the solid line and the broken line are different, and the input power can be decreased more by decreasing the number of revolutions of the laser blower 17 when the same laser output is obtained in the range of a region A. In contrast, the input power can be decreased more by increasing the number of revolutions of the laser blower 17 when the same laser output is obtained in the range of a region B.

In the present embodiment, a case of setting the laser output to 4000 watts corresponds to being used in the range of the region B, and a case of setting the laser output to 2000 watts corresponds to being used in the range of the region A. Accordingly, in the energy saving mode in which the laser output is set to be lower than 2000 watts, energy efficiency can be further improved by reducing the number of revolutions of the laser blower 17 to 9000 rpm.

Next, for the "temperature setting of cooling device 15", the temperature is set to 10±3° C. in the quality emphasis mode and the productivity emphasis mode. In the energy saving mode, the temperature is set to 15±3° C., which is higher than that in the quality emphasis mode and the productivity emphasis mode. This is because the output range of the laser beam in the energy saving mode is less than that in the quality emphasis mode and the productivity emphasis mode, and thus even when the temperature of the cooling device 15 is increased, the laser oscillator 30 can be sufficiently cooled.

Figure 5:
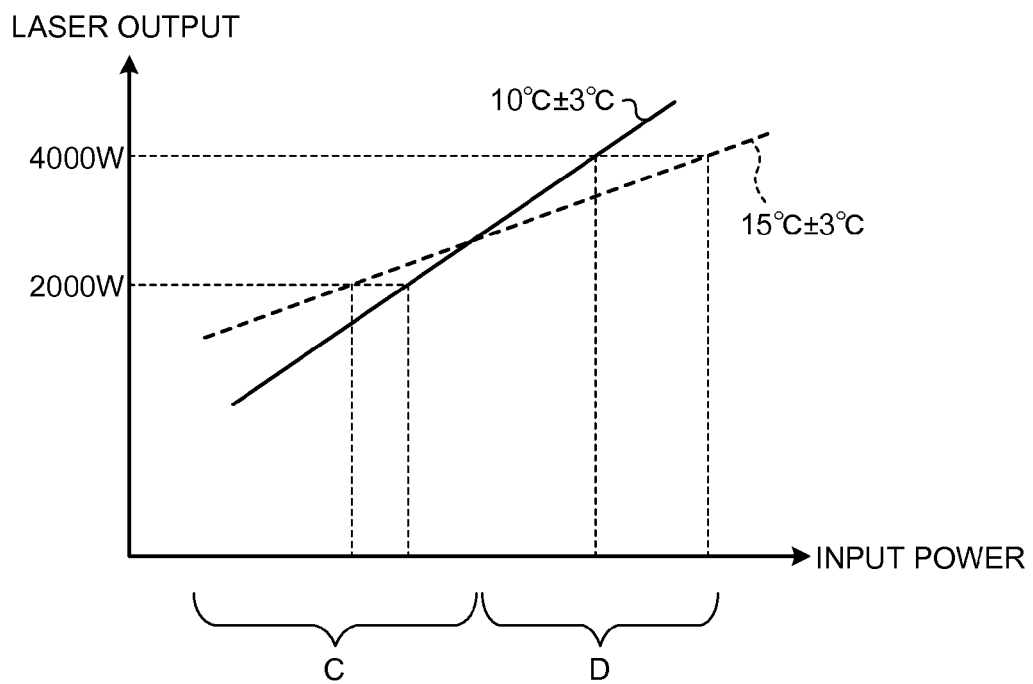
FIG. 5 is a diagram that illustrates the relation between input power to the discharge electrodes and laser output when the temperature of a cooling device is varied.

Furthermore, in terms of energy efficiency, it is preferable to increase the temperature of the cooling device 15 in the energy saving mode. FIG. 5 is a diagram that illustrates the relation between input power to the discharge electrodes 12 and the laser output when the temperature of the cooling device 15 is varied. In FIG. 5, the case where the temperature of the cooling device 15 is 10±3° C. is denoted by a solid line, and the case where the temperature of the cooling device 15 is 15±3° C. is denoted by a broken line.

As illustrated in FIG. 5, the inclinations of the solid line and the broken line are different, and the input power can be decreased more by increasing the temperature of the cooling device 15 while obtaining the same laser output in the range of a region C. In contrast, the input power can be decreased more by decreasing the temperature of the cooling device 15 while obtaining the same laser output in the range of a region D.

In the present embodiment, the case of setting the laser output to 4000 watts corresponds to use in the range of the region D; and the case of setting the laser output to 2000 watts corresponds to use in the range of the region C. Accordingly, in the energy saving mode when the laser output is set to be lower than 2000 watts, energy efficiency can be improved more by increasing the temperature of the cooling device 15 to 15±3° C.

Next, the "purge flow rate of optical path duct 2" is set to 50 L/min in the quality emphasis mode and the productivity emphasis mode. In the energy saving mode, the "purge flow rate of optical path duct 2" is set to 25 L/min, which is less than that in the quality emphasis mode and the productivity emphasis mode. This is because the output range of the laser beam in the energy saving mode is less than that in the quality emphasis mode and the productivity emphasis mode, thereby reducing laser beam deterioration due to absorption by gas in the optical path; and thus even if the flow rate of purge gas is decreased, the laser beam deterioration can be sufficiently reduced.

Next, the "drawn air volume of dust collector 7" is set to 80 m³/min in the quality emphasis mode and the productivity emphasis mode. In the energy saving mode, the "drawn air volume of dust collector 7" is set to 60 m³/min, which is less than that in the quality emphasis mode and the productivity emphasis mode. This is because the machining speed in the energy saving mode is lower than that in the quality emphasis mode and the productivity emphasis mode, thereby reducing the amount of generated dust; and thus even when the drawn air volume of the dust collector 7 is decreased, dust collection can be performed sufficiently.

There are cases where switching between operation modes is performed with a switching operation by a user and a case where the control unit 10 automatically switches between the operation modes. A case where switching between the operation modes is performed with a switching operation by a user, for example, it can be configured that information indicating the present operation mode is displayed on the display unit 11, and the user operates an operating unit (not illustrated) to switch the present mode to an arbitrary operation mode.

For example, when the delivery deadline of a product is near and it is preferable to prioritize the production efficiency regardless of the energy consumption amount, the operation mode is appropriately switched to the productivity emphasis mode. Further, for example, when there is enough time to meet the delivery deadline of a product and high machining accuracy is not required, the operation mode is appropriately switched to the energy saving mode. Further, for example, when there is enough time until the delivery deadline of a product and high machining accuracy is required, the operation mode is appropriately switched to the quality emphasis mode.

A case where the operation mode is automatically switched is, for example, where the configuration is such that when the control unit 10 has received laser-beam deterioration information that is transmitted from the operation-state monitoring unit 9, the control unit 10 automatically switches the operation mode to the energy saving mode. In this case, the control unit 10 functions as a mode switching unit that automatically switches between the operation modes. When the laser-beam deterioration information is transmitted, as described above, it is highly probable that the laser beam has deteriorated.

When the laser beam has deteriorated and when the output range of the laser beam is of the quality emphasis mode or of the productivity emphasis mode, the effect of a decrease in the machining accuracy is large, and machining of the workpiece 20 may not be continued. However, even when the laser beam has deteriorated, the effect of a decrease in the machining accuracy can be reduced by reducing the moving speed of the machining head 4 while reducing the output range of the laser beam to low.

Accordingly, even if the laser beam has deteriorated, as long as the operation mode is in the energy saving mode in which the output range of the laser beam is reduced to low and the moving speed of the machining head 4 is reduced to low, machining of the workpiece 20 may be performed while maintaining a certain degree of the machining quality. Therefore, in the present embodiment, when the laser-beam deterioration information is received, that is, when the laser beam has been determined to be deteriorated, machining of the workpiece 20 can be continued while maintaining a certain degree of machining quality by automatically switching the operation mode to the energy saving mode.

In a case where the energy saving mode is not provided, machining of the workpiece 20 cannot be performed until the laser beam deterioration is improved, and thus a considerable decrease in production efficiency may be caused. Particularly, in a case where a maintenance worker cannot be mobilized promptly or it takes time to supply replacement components, the time period for which the machining is suspended becomes long, which may cause considerable problems.

In contrast, in the present embodiment, even when the laser beam has deteriorated, the operation mode can be switched to the energy saving mode so as to be able to continue machining of the workpiece 20, thereby enabling a reduction on the decrease in the production efficiency.

In the case where automatic switching of the operation mode to the energy saving mode is performed, the configuration can be such that the switching of the operation mode to the energy saving mode is displayed on the display unit 11 to inform the user thereof, and thus the user can promptly ascertain that the machining speed has been decreased due to the switching of the operation mode.

When the user can promptly ascertain that the operation mode has been switched to the energy saving mode, the user can promptly address the maintenance of the laser oscillation device 1 and the like, and the operation mode can be promptly returned to the quality emphasis mode or the productivity emphasis mode.

Furthermore, the configuration can be such that, before automatic switching to the energy saving mode is performed, information indicating that the operation mode is to be switched to the energy saving mode is displayed on the display unit 11 and that, only when the user approves the switching of the operation mode by operating an operating unit (not illustrated) or the like, is the operation mode automatically switched to the energy saving mode. With such a configuration, the user can more reliably be aware of switching of the mode into the energy saving mode.

As described above, the laser machining device according to the present embodiment can machine a workpiece by switching operation modes in which parameters unique to the laser machining device are varied. Particularly, as for the parameters settable by a user, the parameter value is specified within a range to which each of the operation modes is set while giving the user a certain degree of flexibility when the user selects the operation modes. As for the parameters that are not settable by the user, the value of each parameter is automatically changed taking into consideration the energy efficiency and energy saving for each of the operation modes.

Further, even when the laser beam deteriorates due to age deterioration or the like, by continuing the operation in the energy saving mode, machining of the workpiece 20 can be continued while maintaining a certain degree of machining quality. Accordingly, a decrease in the production efficiency can be reduced.

Note that the each of the parameter values described in the above explanations is only exemplary and can be modified according to the specification of the laser machining device to be used or usage purposes thereof.

REFERENCE SIGNS LIST 1 laser oscillation device, 2 optical path duct, 3 bend mirror (optical system), 4 machining head, 5 drive unit, 6 purge unit, 7 dust collector, 8 switching unit, 9 operation-state monitoring unit, 10 control unit, 11 display unit, 12 discharge electrode, 13 partial reflection mirror, 14 total reflection mirror, 15 cooling device, 16 casing, 17 laser blower (air blower), 20 workpiece, 21 thermometer, 23 storage unit, 30 laser oscillator, 50 laser machining device.

The invention claimed is:

1. A laser machining device comprising:
a laser oscillator that oscillates a laser beam;
a machining head that irradiates the laser beam emitted from the laser oscillator onto a workpiece; and
an optical path duct that includes an optical system that guides the laser beam from the laser oscillator to the machining head, wherein:
a plurality of operation modes comprising an energy saving mode, a productivity emphasis mode and a quality emphasis mode, in each of which a parameter used when the workpiece is being machined is varied, are provided for the laser machining device,
in the energy saving mode, an output range of the laser beam, as the parameter, is set to be less than that in other operation modes,
in the productivity emphasis mode, a moving speed of the machining head, as the parameter, is set to be higher than that in other operation modes, and
in the quality emphasis mode, an output range of the laser beam is set to be larger than that in the energy saving mode and a moving speed of the machining head is set to be lower than that in the productivity emphasis mode.

2. The laser machining device according to claim 1, further comprising
a laser blower that circulates laser gas within the laser oscillator, wherein
in the energy saving mode, the number of revolutions of the laser blower, as the parameter, is set to be lower than that in the quality emphasis mode and the productivity emphasis mode, and
with regard to an input power amount to the laser oscillator in the energy saving mode, the laser beam oscillated at the number of revolutions of the laser blower in the energy saving mode has a larger output than that of the laser beam oscillated at the number of revolutions of the laser blower in the quality emphasis mode and the productivity emphasis mode.

3. The laser machining device according to claim 1, further comprising
a cooling device that cools the laser oscillator by causing a fluid to flow through the inside of the laser oscillator, wherein
in the energy saving mode, a temperature of the cooling device, as the parameter, is set to be higher than that in the quality emphasis mode and the productivity emphasis mode, and
with regard to an input power amount to the laser oscillator in the energy saving mode, the laser beam oscillated at the temperature of the cooling device in the energy saving mode has a larger output than that of the laser beam oscillated at the temperature of the cooling device in the quality emphasis mode and the productivity emphasis mode.

4. The laser machining device according to claim 1, further comprising
a purge unit that causes purge gas to flow through the inside of the optical path duct, wherein
in the energy saving mode, the purge unit sets a flow rate of the purge gas, as the parameter, to be less than that in the quality emphasis mode and the productivity emphasis mode.

5. The laser machining device according to claim 1, further comprising:
an output switching unit that switches an output setting of the laser beam; and
an output regulating unit that, when an output of the laser beam set by the output switching unit is out of a range of an output setting set in an operation mode being currently operated, regulates the laser beam being oscillated in accordance with the output set by the output switching unit.

6. The laser machining device according to claim 1, further comprising:
a speed switching unit that switches a moving speed setting of the machining head; and
a speed regulating unit that, when a moving speed of the machining head set by the speed switching unit is out of a range of a moving speed set in the operation mode being currently operated, regulates the machining head operation in accordance with the moving speed set by the speed switching unit.

7. The laser machining device according to claim 1, further comprising:
an operation-state monitoring unit that monitors an operation state of the laser machining device; and
an automatic mode switching unit that automatically switches the operation mode on the basis of the operation state.

8. The laser machining device according to claim 7, wherein
an operation state monitored by the operation-state monitoring unit is the accumulated time period during which the laser beam is oscillated, and
the automatic mode switching unit automatically switches the operation mode to the energy saving mode when the accumulated time period exceeds a preset threshold.

9. The laser machining device according to claim 7, wherein
an operation state monitored by the operation-state monitoring unit is a beam shape of the laser beam, and
the automatic mode switching unit automatically switches the operation mode to the energy saving mode on the basis of a change in the beam shape.

* * * * *